United States Patent
Chen et al.

(10) Patent No.: US 7,357,576 B2
(45) Date of Patent: Apr. 15, 2008

(54) LINEAR SLIDING RAIL HAVING A SELF-LUBRICATING UNIT CAPABLE OF ADJUSTING A LUBRICANT AMOUNT SUPPLIED THEREFROM

(75) Inventors: Jen-Sheng Chen, Taichung (TW); Hsin-Tsun Hsu, Taichung (TW)

(73) Assignee: Hiwin Technologies Corp., Taichung (TW)

(*) Notice: Subject to any disclaimer, the term of this patent is extended or adjusted under 35 U.S.C. 154(b) by 229 days.

(21) Appl. No.: 11/336,807

(22) Filed: Jan. 23, 2006

(65) Prior Publication Data

US 2007/0172158 A1    Jul. 26, 2007

(51) Int. Cl.
*F16C 29/06* (2006.01)
*F16C 33/66* (2006.01)

(52) U.S. Cl. .......................................... 384/13; 384/45
(58) Field of Classification Search ............... 384/13, 384/15, 43–45
See application file for complete search history.

(56) References Cited

U.S. PATENT DOCUMENTS

| | | | | |
|---|---|---|---|---|
| 6,019,513 A | * | 2/2000 | Tsukada et al. | 384/15 |
| 6,123,457 A | * | 9/2000 | Suzuki et al. | 384/13 |
| 6,155,717 A | * | 12/2000 | Michioka et al. | 384/15 |
| 6,250,804 B1 | * | 6/2001 | Hsu et al. | 384/13 |
| 6,257,766 B1 | * | 7/2001 | Agari | 384/45 |
| 6,401,867 B1 | * | 6/2002 | Michioka et al. | 384/13 |
| 6,461,045 B1 | * | 10/2002 | Kamimura et al. | 384/13 |

* cited by examiner

*Primary Examiner*—Thomas R. Hannon

(57) ABSTRACT

A linear sliding rail has a self-lubricating unit capable of adjusting a lubricant amount supplied therefrom. The linear sliding rail has a sliding body and a lubricant tank fitted thereon. Within the lubricant tank, a lubricant-containing device is received, through which a lubricant is released to lubricant the sliding rail. Within the lubricant tank, there are also pressing bodies. Screws are used to assemble the components in the self-lubricating unit and penetrate and protrude the tank cover so that a distal end of each of the screws may be connected with an adjustment bolt. Thus, the purpose of lubricant amount adjustment may be achieved by placing the pressing bodies against the lubricant-containing device at different levels according to the user's requirement.

9 Claims, 7 Drawing Sheets

LINEAR SLIDING RAIL HAVING A SELF-LUBRICATING UNIT CAPABLE OF ADJUSTING A LUBRICANT AMOUNT SUPPLIED THEREFROM

BACKGROUND OF THE INVENTION

1. Field of the Invention

The present invention relates to a linear sliding rail having a self-lubricating unit capable of adjusting a lubricant amount supplied therefrom. More particularly, the present invention relates to a self-lubricating unit which continuously adjusts the lubricant supplied therefrom at any time without the need of detaching a linear sliding body attached thereto so as to achieve the optimal efficiency and meet the requirements of a user.

2. Description of Related Art

In a mechanical processing platform, a linear sliding rail is generally utilized to carry and guide a sliding body which is used to position a processing tool or a to-be-processed object. Accordingly, how precise the to-be-processed object may be processed is directly dependent on how precise, wear-resistive and sensitive to heat of the shape of the sliding body and thus should be well designed by a designer of the art.

Referring to FIG. 1, a schematic diagram of a prior art sliding rail structure is shown therein. As shown, a sliding body is movably fitted on a sliding rail 130. At two sides of the sliding rail 130, bead slots 131 are disposed on which rolling beads (not shown) are disposed for contacting with the sliding body 100 so that the sliding body 100 may move precisely on the sliding rail 130. At two ends of the sliding body 100, an end cover 110 is disposed. At an outer side of the end cover 110, a lubricant removing piece 120 is disposed, on which a hole 121 is provided. The lubricant removing piece 120 is fixed to the end cover 110 through screws 122 each penetrating a threaded hole 111 of the end cover 110. The lubricant removing piece 120 is used to enhance lubricate sealing capability for the sliding body 100 and also remove redundant lubricate and screenings on the sliding body 100. Therefore, the performance of the lubricating system is critical to the linear sliding rail and thus the self-lubricating unit stays at the heart of research for the linear sliding rail. Generally, a self-lubricating capable lubricant storage unit is disposed within the sliding body and the sliding rail may be lubricated by the lubricate automatically released from the lubricant storage unit. As such, difficulty and error caused from an operator may be reduced. Currently, there are some lubricating mechanisms of such self-lubricating units set forth, which will be described below.

At a facet of the sliding body, a lubricating body made of a porous plastic material is mounted to cover the linear sliding rail, which may be seen in, for instance, U.S. Pat. Nos. 6,019,513 and 6,461,045. In the lubricating body, a lubricating medium is contained so as to directly lubricate the lubricate bead slot of the sliding rail.

A self-lubricating unit is amounted at the facet of the sliding body, which may be seen in, for instance, in U.S. Pat. Nos. 6,401,867, 6,155,717 and TW patents 572143. The self-lubricating unit has a lubricate-rich material which can be served as a lubricate container and a lubricant-containing device which is used to deliver the lubricant. When the lubricant-containing device is contacted with the sliding rail, the lubricant can be supplied to the bead slots.

A lubricant tank in which the lubricant is received is amounted at a facet of the sliding body. Such technology may be seen in, for instance, U.S. Pat. Nos. 6,123,457 and 6,257,766. The lubricant is delivered to bead slots through a lubricant-containing device which covers an opening of the lubricant tank.

A lubricant storage hole is formed on the sliding body, which may be seen, for example, in U.S. Pat. No. 6,250,804. The lubricant is drawn out from the lubricant storage hole by means of a cellulose containing material such as wool felt through capillarity and then onto the roll beads within the sliding body.

For the above mentioned linear self-lubricating units, all they provide the lubricant through the fine hole based on capillarity so that the linear sliding rail is lubricated. Since such designs may provide good performance in terms of lubricating of the sliding body, manual labor may be saved. However, the above and prior art lubricating designs may only supply a fixed amount of lubricant, i.e. the supplied amount of the lubricant has been set according to a specific lubricating task when the lubricating system is manufactured, it is impossible to change the supplied amount of the lubricant when the lubricating task is under the way. When the linear sliding rail is intended to have another working state, e.g. an increased lubricant amount is required when a larger load is added, the sliding body structure has to be detached so that the self-lubricating unit may be replaced or adjusted properly. For example, the lubricant supplying material has to be replaced so that the new lubricant supplying material may draw a different lubricant amount and thus provide a different lubricating effect. Finally, the sliding body has to be assembled to finish the following lubricating process.

Furthermore, a lubricating extent of the linear sliding rail structure having the self-lubricating unit may not be real time adjusted for a large load. The replacement task has to be conducted with the machine off the line, which wastes process time and reduces working efficiency. Moreover, the detachment and replacement requirements of the self-lubricating unit necessitate a different manufacturing method of the linear sliding rail as compared to the standard manufacturing process, leading to an increased cost and a difficult maintenance work.

In view of the shortcomings existing in the prior art self-lubricating units of the current linear sliding rail, the Inventor has made a continuous research and finally sets forth a linear sliding rail having a self-lubricating unit capable of adjusting a lubricant amount supplied therefrom without the need of modifying the current linear sliding rail structure.

SUMMARY OF THE INVENTION

The present invention is to provide a sliding rail having a self-lubricating unit capable of adjusting a lubricant amount supplied therefrom, which may adjust continuously the lubricant amount at any time according to the user's requirement so that the lubricant may be used most efficiently in prevention of waste or insufficiency and the linear sliding rail may be maintained in a normal working state.

Another, the present invention is to provide a linear sliding rail having a self-lubricating unit capable of adjusting a lubricant amount supplied therefrom, in which the self-lubricating unit is separately designed without the need of modification of an original standard manufacturing process of a conventional linear sliding rail so that quality of the linear sliding rail may be maintained.

Still another, the present invention is to provide a linear sliding rail having a self-lubricating unit capable of adjusting a lubricant amount supplied therefrom, through which no any detachment work is required when the supplied lubricant amount is to be adjusted, saving labor work, maintaining the sliding body in an integrated state and avoiding the sliding body from damage.

According to the present invention, the linear sliding rail having a self-lubricating unit capable of adjusting a lubricant amount supplied therefrom, the linear sliding rail having a sliding body and a sliding rail. At two sides of the sliding rail, bead slots are formed and the sliding body is fitted on the sliding rail. By means of the beads moving within the bead slot, the sliding body moves on the sliding rail. At two sides of the sliding body, an end cover is disposed. A lubricant tank is disposed between the end cover and the lubricant removing piece and has an opening at an outer side thereof sealed by a tank cover. Within the lubricant tank, a lubricant-containing device is received, through which a lubricant is released to the sliding rail by means of capillarity. Within the lubricant tank, there are also pressing bodies align to a portion of the lubricant-containing device contacted with the sliding rail. The pressing bodies each have a shape so that the pressing body presses the lubricant-containing device wholly and uniformly and a lubricant output end of the lubricant-containing device is exposed to facilitate the lubricant to output. Screws are used to assemble the pressing bodies and the lubricant-containing device and the screws penetrate and protrude the tank cover so that a distal end of each of the screws may be connected with an adjustment bolt. Thus, the continuous lubricant amount adjustment purpose may be achieved by placing the pressing bodies against the lubricant-containing device at different levels through operating the adjustment bolt.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 8:
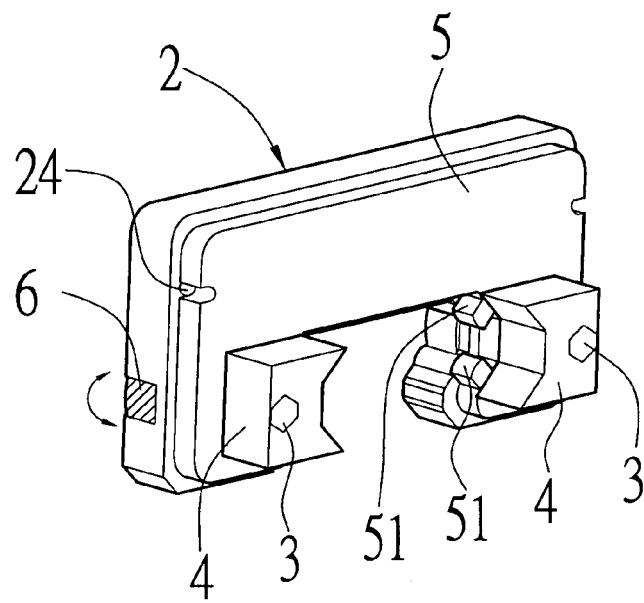
FIG. 8 is a perspective view of the self-lubricating unit according to the present invention.
Figure 9:
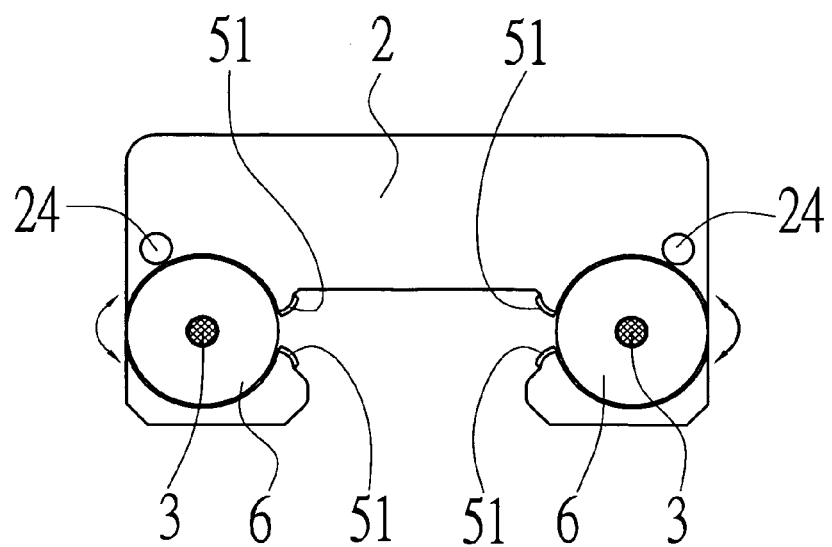
FIG. 9 is a side view of the self-lubricating unit seen from the tank cover according to the present invention.
Figure 10:
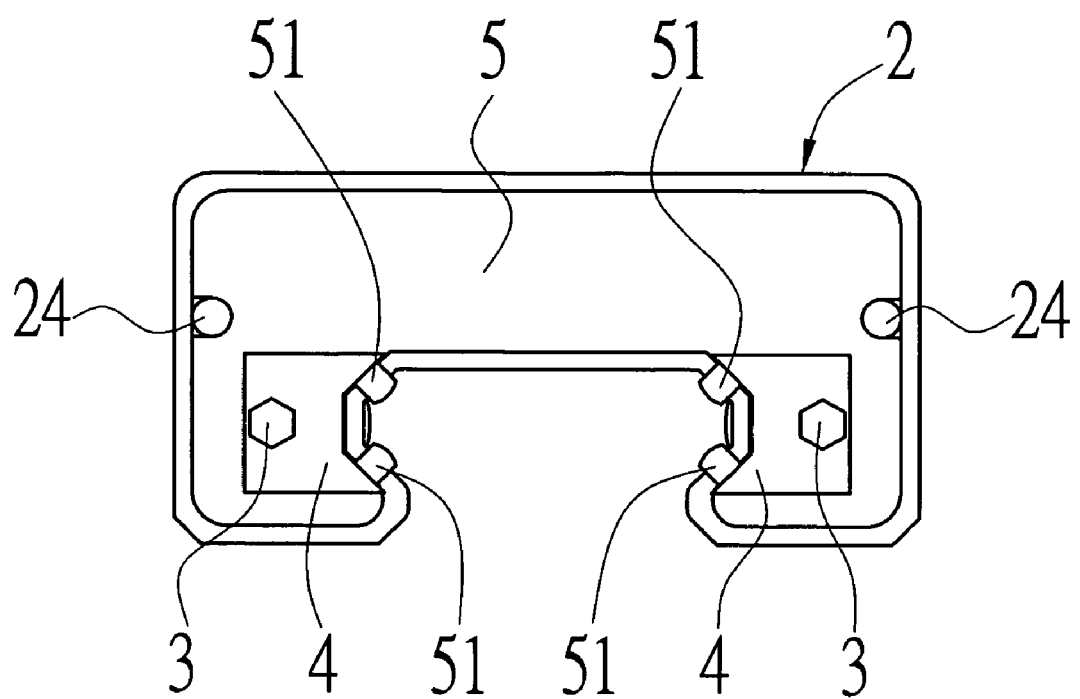
FIG. 10 is a side view of the self-lubricating unit seen from the lubricant-containing device according to the present invention.

Referring to FIGS. 2 to 7, a self-lubricating unit of the present invention is shown therein. As shown, the self-lubricating unit comprises a lubricant tank 1 on which a connection hole 14 is formed. At an outer side of the lubricant tank 1, a tank cover 2 is disposed to seal the lubricant tank 1. In the lubricant tank 1, a lubricant-containing device 5 is received. The lubricant-containing device 5 is made of a porous lubricate-absorptive device, such as wool felt, so that it can supply the lubricant when contacted with a sliding rail 130. Two pressing bodies 4 each formed with a positioning hole 41 are disposed within the lubricant tank 1 at a location corresponding to a contact portion of the lubricant-containing device 5 with the sliding rail 130. The pressing bodies 4 may press against the lubricant-containing device 5 at different levels and through which the supplied lubricant amount may be adjusted. On the lubricant-containing device 5, through holes 52 are formed. Screws 3 are each provided to penetrate a corresponding one of the through holes 52 so that the pressing bodies 4 may be fixed to the lubricant-containing device 5. Then, the screws 3 penetrate and protrude the lubricant tank 2 and are fixed by blots. The above assembled body may be seen in FIGS. 8 to 10.

Figure 1:
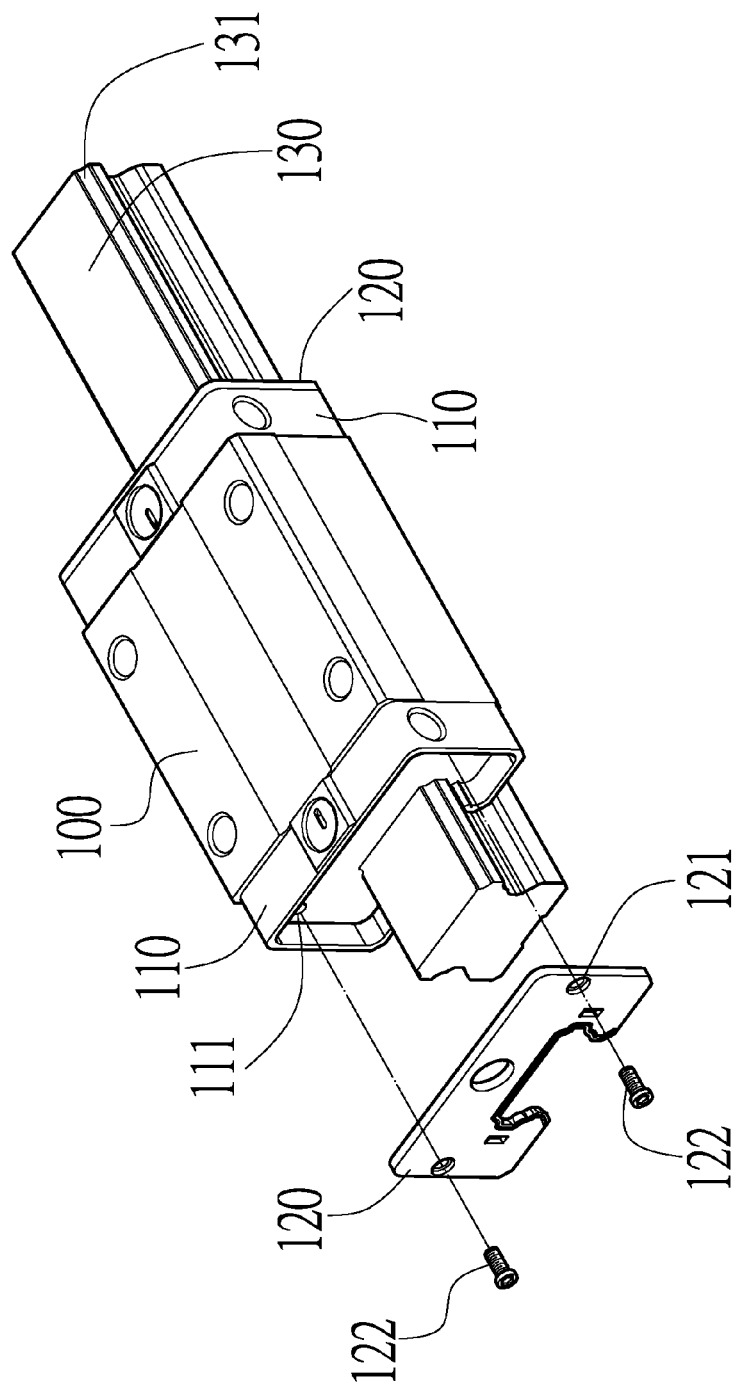
FIG. 1 is a schematic view of a prior art linear sliding rail in which a lubricant removing piece is separately disposed with respect to an end cover.
Figure 2:
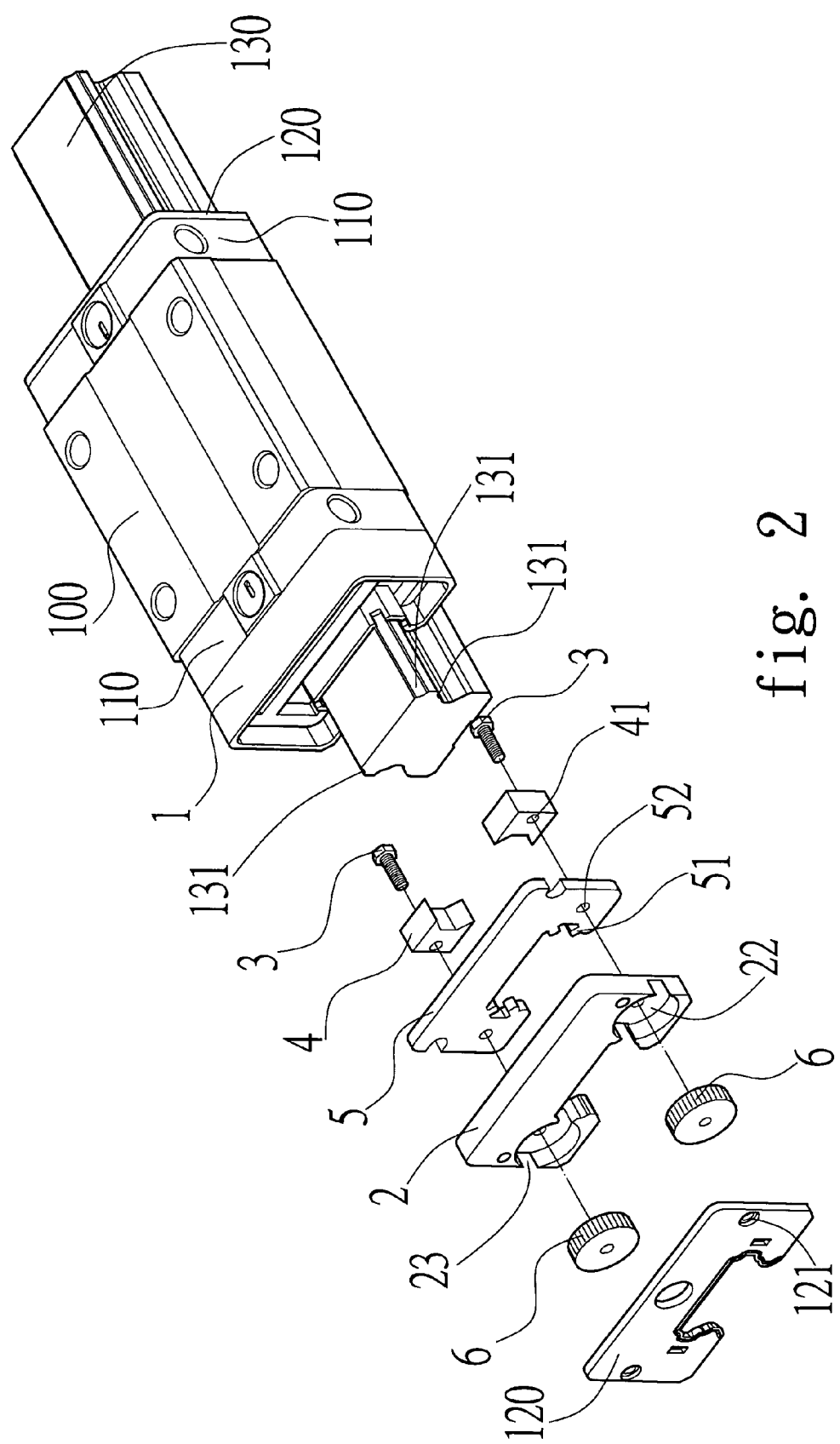
FIG. 2 is an exploded view of a linear sliding rail having a self-lubricating unit capable of adjusting a lubricant amount supplied therefrom according to the present invention.
Figure 3:
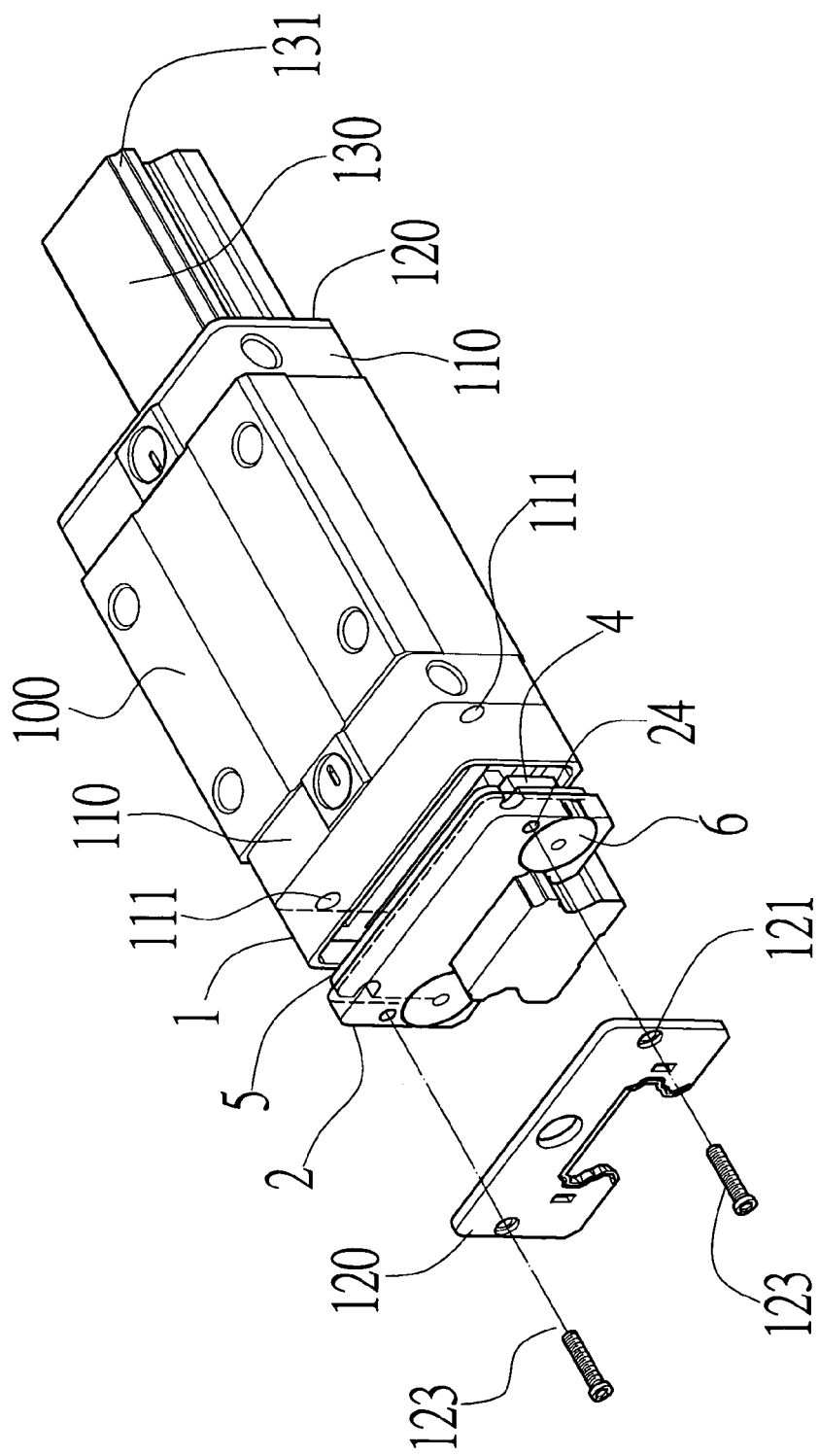
FIG. 3 is a schematic view of a combination of the linear sliding rail and the self-lubricating unit according to the present invention.

As described above, the lubricant tank 1, tank cover 2, screws 3, pressing bodies 4, lubricating-containing device 5 and adjustment bolts 6 are integrated as the self-lubricating unit taking the form of a single body, which is shown in FIG. 3. Since the lubricant tank 2 has fixation holes 24 formed thereon, the single body self-lubricating unit may be disposed between the end cover 110 and a lubricant removing piece 120. Then, screws 123 are provided to fix the lubricant removing piece 120, tank cover 2, lubricant tank 1 and end cover 110 through open holes 121, the fixation holes 24 and connection holes 14. As such, the self-lubricating unit is positioned and fixed to screw holes 111 of the end cover 110 and the self-lubricating unit is thus completely assembled.

Since a portion of each of the adjustment bolts 6 is exposed at an opening 23 of the tank cover 2 (shown in FIGS. 8 and 9), how closely the pressing body 4 is pressed against the lubricant-containing device 5 may be adjusted by rotating the adjustment bolts 6 through the opening 23 of the tank cover 2. When the pressing body 4 approaches further to the tank cover 2, volume of the lubricant-containing device 5 reduces gradually, thereby reducing the supplied lubricant amount released therefrom. Thus, the lubricate may be saved. On the other hand, if a heavier load is required, the adjustment bolt 6 may be rotated inversely according to the user's requirement. As such, the pressing body 4 may be moved farer from the tank cover 2, making the volume of the lubricant-containing device 5 to be larger and looser so that the supplied lubricant amount may met the requirement of the heavier load.

Figure 4:
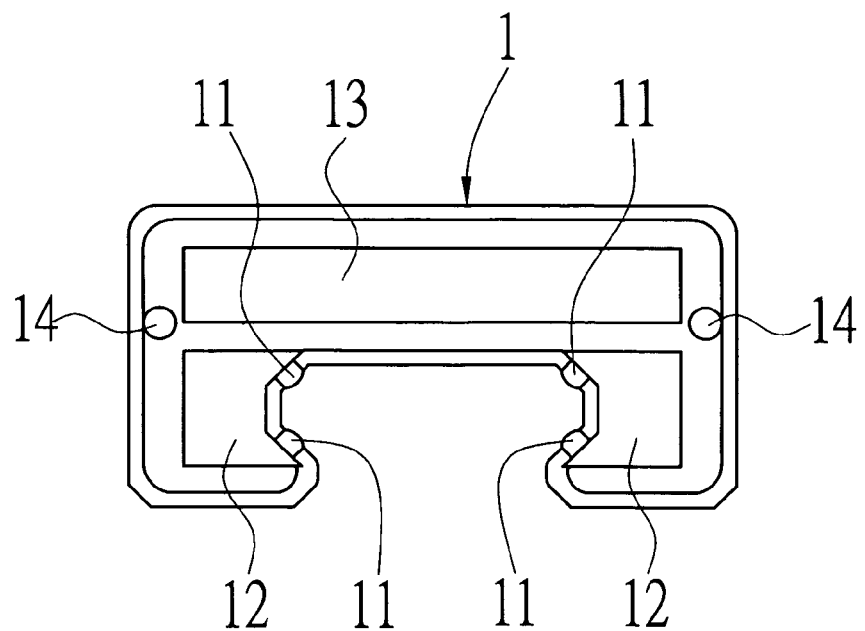
FIG. 4 is a side view of a lubricant tank according to the present invention.
Figure 5:
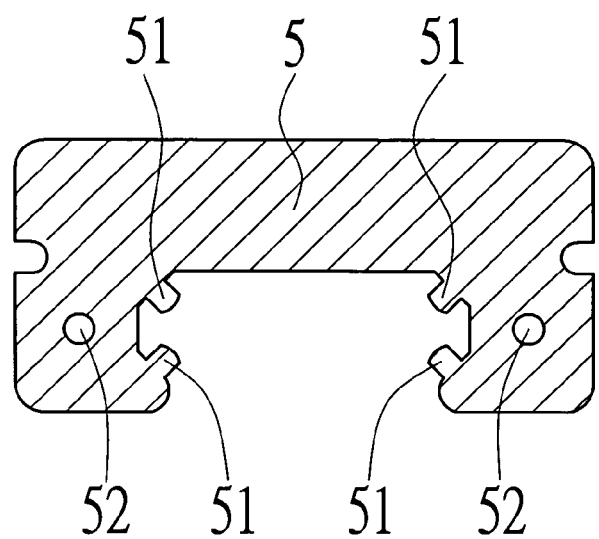
FIG. 5 is a side view of a lubricant-containing device according to the present invention.

FIG. 4 is a side view of the tank cover of the self-lubricating unit. FIG. 5 is a side view of the lubricant-containing device. In the lubricant tank 1, there are open slots 11, which are aligned to a lubricant output end 51 disposed at an inner side of the lubricant-containing device 5. The open slot 11 is provided for a contact between the lubricant output end 51 of the lubricant-containing device 5 and the bead slots 131 of the sliding rail 130. When the sliding body 100 moves on the sliding rail 130, the lubricant output end 51 automatically lays the lubricate on the bead slots 131 of the sliding rail 130 based on the surface tension and the adhesive force. In addition, the lubricant tank 1 further has a reception trough 12 and a lubricant storage trough 13. The lubricant storage trough 13 is provided for storage of the lubricant while the reception trough 12 for receiving the pressing body 4 therein. With related to the pressing body 4, it has to be designed with shape of the lubricant-containing device 5 and the lubricant output end 51 so that the pressing body 4 may wholly and uniformly press the lubricant-containing device 5 and the lubricant output end 51 may be exposed to facilitate the lubricant supplying.

Figure 6:
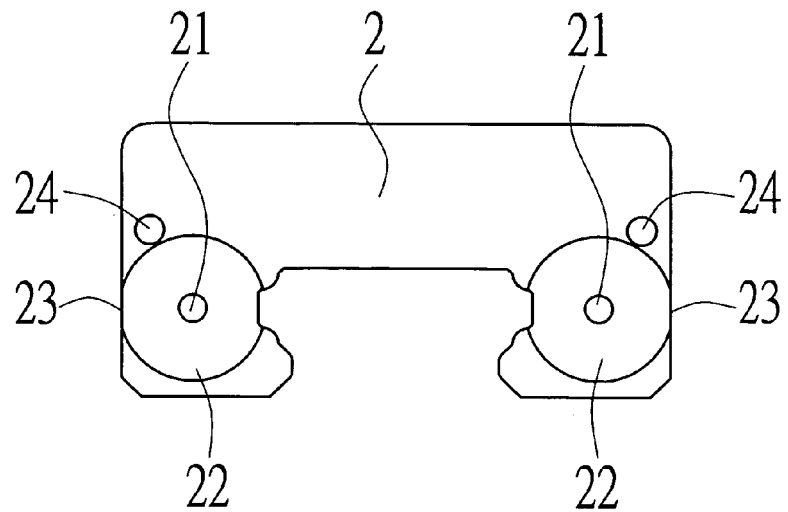
FIG. 6 is a side view of a tank cover according to the present invention.
Figure 7:
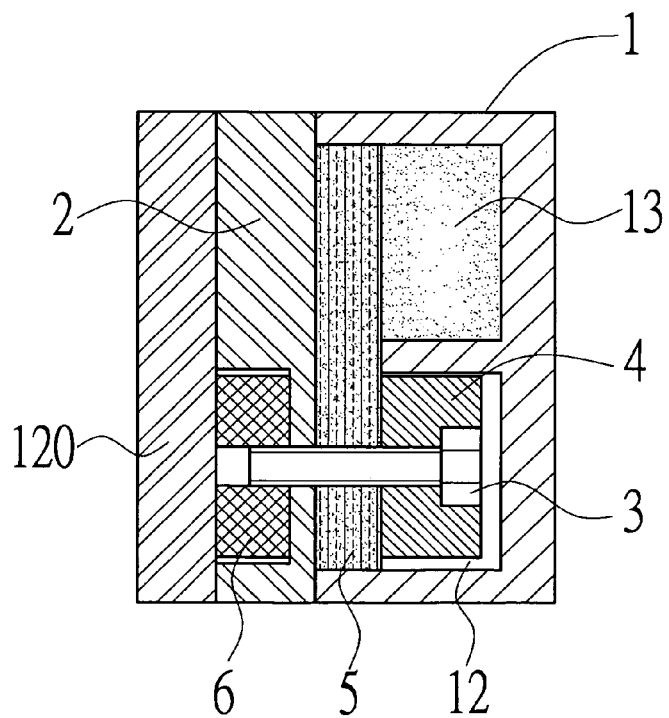
FIG. 7 is a cross-sectional view of the self-lubricating unit according to the present invention.

FIG. 6 is a side view of the lubricant tank. On a surface of the lubricant tank 2, through-holes 21 are formed so that screws 3 may penetrate them. Around each of the through-holes 21, a fillister 22 is so formed for receiving the adjustment bolt 6 that the adjustment bolt 6 sits flush with the tank cover 2. As such, the lubricant removing piece 120 may be properly fixed. The fillister 22 and the adjustment blot 6 each have a diameter slightly greater than a distance of the through-hole 21 to a side of the lubricant tank 2 so that an opening 23 may be naturally formed at an outer side of the fillister 22 and the tank cover 2. When the adjustment bolt 6 is placed on the fillister 22, the side of the adjustment bolt 6 is naturally exposed beyond the opening 23. As such, the adjustment bolt 6 may be accessed without the need of detaching the sliding body.

Based on the above structure, the adjustment bolt 6 has the portion exposed outside the opening 23 and thus the adjustment bolt 6 may be controlled without detaching the sliding body. Namely, the screws 3 rotate as the adjustment bolts 6 are controlled through the openings 23, thereby controlling the pressing body 4 on the screws 3 to move forward or backward. As such, the pressing unit 4 may be successively controlled to approach or move farer from the lubricant-containing device 5. When the sliding body 100 moves on the sliding rail 130, the lubricant output end 51 supplies the lubricant from the lubricant-containing device 5 according to how closely the pressing body 4 is contacted with the lubricant-containing device 5.

In view of the description above, the self-lubricating unit may continuously adjust the supplied lubricant amount at any time without detaching the linear sliding rail system so that the lubricate contained in the lubricant tank may be prevented from loss and utilized in an optimal way. As such, the working efficiency with respect to the sliding body and the sliding rail may be optimal.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A linear sliding rail having a self-lubricating unit capable of adjusting a lubricant amount supplied therefrom, the linear sliding rail comprising a sliding rail and a sliding body fitted thereon, the sliding body having two ends each having an end cover and a lubricant removing piece, the self-lubricating unit comprising:

a lubricant tank having a container disposed therein and having an open slot, a reception trough, a lubricant storage trough and connection holes;

a tank cover disposed at an opening at an outer side of the container of the lubricant tank and having fixation holes and fillister each having a through-hole formed thereon, the fillister and an outer side of the tank cover forming an opening;

a lubricant-containing device disposed within the lubricant tank and having a lubricant output end and through-holes thereon to provide a contact between the lubricant output end and the sliding rail through the open slot of the lubricant tank;

two pressing bodies each having a positioning hole formed thereon and disposed within the lubricant tank located interior to the lubricant-containing device and aligned to a portion of the lubricant-containing device contacted with the sliding rail;

two screws penetrating the positioning holes of the pressing bodies and the through-holes of the lubricant-containing device and then penetrating and protruding the through-holes of the tank cover; and two adjustment bolts each connected to one of a distal end of the screws and received within a corresponding one of the fillisters of the tank cover to adjust how closely the pressing bodies are contacted with the lubricant-containing device by being rotated.

2. The linear sliding rail according to claim 1, wherein the container of the lubricant tank is allowed to receive the pressing bodies therein and the pressing bodies each has a shape so that the pressing bodies press wholly and uniformly on the lubricant-containing device and expose the lubricant output end so as to facilitate the lubricate to output.

3. The linear sliding rail according to claim 1, wherein the lubricant output end is contacted with the bead slots of the sliding rail.

4. The linear sliding rail according to claim 1, wherein the lubricant-containing device is a porous lubricant-absorptive device.

5. The linear sliding rail according to claim 4, wherein the lubricant-containing device is wool felt.

6. The linear sliding rail according to claim 1, wherein the self-lubricating unit is disposed between the end cover and the lubricant removing piece.

7. The linear sliding rail according to claim 1, wherein the adjustment bolt has a portion exposed from the opening of the tank cover.

8. The linear sliding rail according to claim 1, wherein the storage trough of the lubricant tank is used to store the lubricant.

9. The linear sliding rail according to claim 1, wherein each of the adjustment bolt sits flush with the tank cover and the fillister and the adjustment bolt each have a diameter slightly greater than a distance of the screws to a outer side of the tank cover so that an opening forms naturally at an outer side of the fillister and the adjustment bolt exposes naturally outside the opening of the fillister when the adjustment bolt is placed within the fillister.

* * * * *